(12) United States Patent
Nault et al.

(10) Patent No.: US 9,903,173 B1
(45) Date of Patent: Feb. 27, 2018

(54) CONNECTION FOR A PRESSURIZED FLUID FLOW PATH

(71) Applicant: Cameron International Corporation, Houston, TX (US)

(72) Inventors: Christopher J. Nault, Houston, TX (US); Kevin Shahrpass, Houston, TX (US); Paul Bunch, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/365,413

(22) Filed: Nov. 30, 2016

(51) Int. Cl.
| E21B 33/038 | (2006.01) |
| E21B 33/064 | (2006.01) |
| E21B 34/04 | (2006.01) |
| E21B 33/06 | (2006.01) |

(52) U.S. Cl.
CPC .......... *E21B 33/038* (2013.01); *E21B 33/064* (2013.01); *E21B 34/04* (2013.01); *E21B 33/062* (2013.01)

(58) Field of Classification Search
CPC .. E21B 33/0375; E21B 33/038; E21B 33/064; E21B 34/04
See application file for complete search history.

(56) References Cited

U.S. PATENT DOCUMENTS

| 5,755,287 | A | * | 5/1998 | Cain | E21B 33/038 166/368 |
| 5,778,918 | A | * | 7/1998 | McLelland | E21B 33/0355 137/15.02 |
| 8,245,776 | B2 | * | 8/2012 | Gette | E21B 33/04 166/195 |
| 8,631,873 | B2 | * | 1/2014 | Sneed | E21B 23/01 138/177 |
| 2016/0039042 | A1 | * | 2/2016 | Riggs | B23K 20/129 405/170 |
| 2016/0168940 | A1 | * | 6/2016 | McMiles | E21B 33/064 166/363 |

* cited by examiner

*Primary Examiner* — Matthew R Buck
(74) *Attorney, Agent, or Firm* — Chamberlain Hrdlicka

(57) ABSTRACT

A subsea connection for a pressurized fluid flow path includes a body comprising a body flow path and a spool attachable to the body. The spool includes a spool flow path in fluid communication with the body flow path with the spool attached to the body and a corrosion resistant layer. A seal is also included and is actuatable against the corrosion resistant layer to form a seal between the body and the spool.

19 Claims, 9 Drawing Sheets

US 9,903,173 B1

CONNECTION FOR A PRESSURIZED FLUID FLOW PATH

CONTEXT

This section is intended to provide relevant contextual information to facilitate a better understanding of the various aspects of the described embodiments. Accordingly, it should be understood that these statements are to be read in this light and not as admissions of prior art.

In most offshore drilling operations, a wellhead at the sea floor is positioned at the upper end of the subterranean wellbore lined with casing, a blowout preventer (BOP) stack is mounted to the wellhead, and a lower marine riser package (LMRP) is mounted to the BOP stack. The upper end of the LMRP typically includes a flex joint coupled to the lower end of a drilling riser that extends upward to a drilling vessel at the sea surface. A drill string is hung from the drilling vessel through the drilling riser, the LMRP, the BOP stack, and the wellhead into the wellbore.

During drilling operations, drilling fluid, or mud, is pumped from the sea surface down the drill string, and returns up the annulus around the drill string. There are a number of functions and operating parameters of the LMRP, BOP, and other subsea well equipment that may need to be monitored and controlled.

As an example, in the event of a rapid invasion of formation fluid into the annulus, commonly known as a "kick," the BOP stack and/or LMRP may actuate to help seal the annulus and control the fluid pressure in the wellbore. In particular, the BOP stack and the LMRP include closure members, or cavities, designed to help seal the wellbore and prevent the release of high-pressure formation fluids from the wellbore. Thus, the BOP stack and LMRP function as pressure control devices.

Denser mud can be circulated into the wellbore down the drill string, up the annulus and out through a choke line at the BOP stack through chokes (flow restrictors) until downhole pressure is overcome. Once "kill weight" mud extends from the bottom of the well to the top, the well has been "killed." If the integrity of the well is intact drilling may be resumed. Alternatively, if circulation is not feasible it may be possible to kill the well by forcibly pumping in the heavier mud from the top and in through a kill line connection at the BOP stack. Accordingly, as fluids are pumped through the subsea system at high pressures and in corrosive environments, the fluid connections between each of the components must be robust and capable of operating and sealing within severe conditions.

DESCRIPTION OF THE DRAWINGS

For a detailed description of the embodiments of the invention, reference will now be made to the accompanying drawings in which.

DETAILED DESCRIPTION

Figure 1:
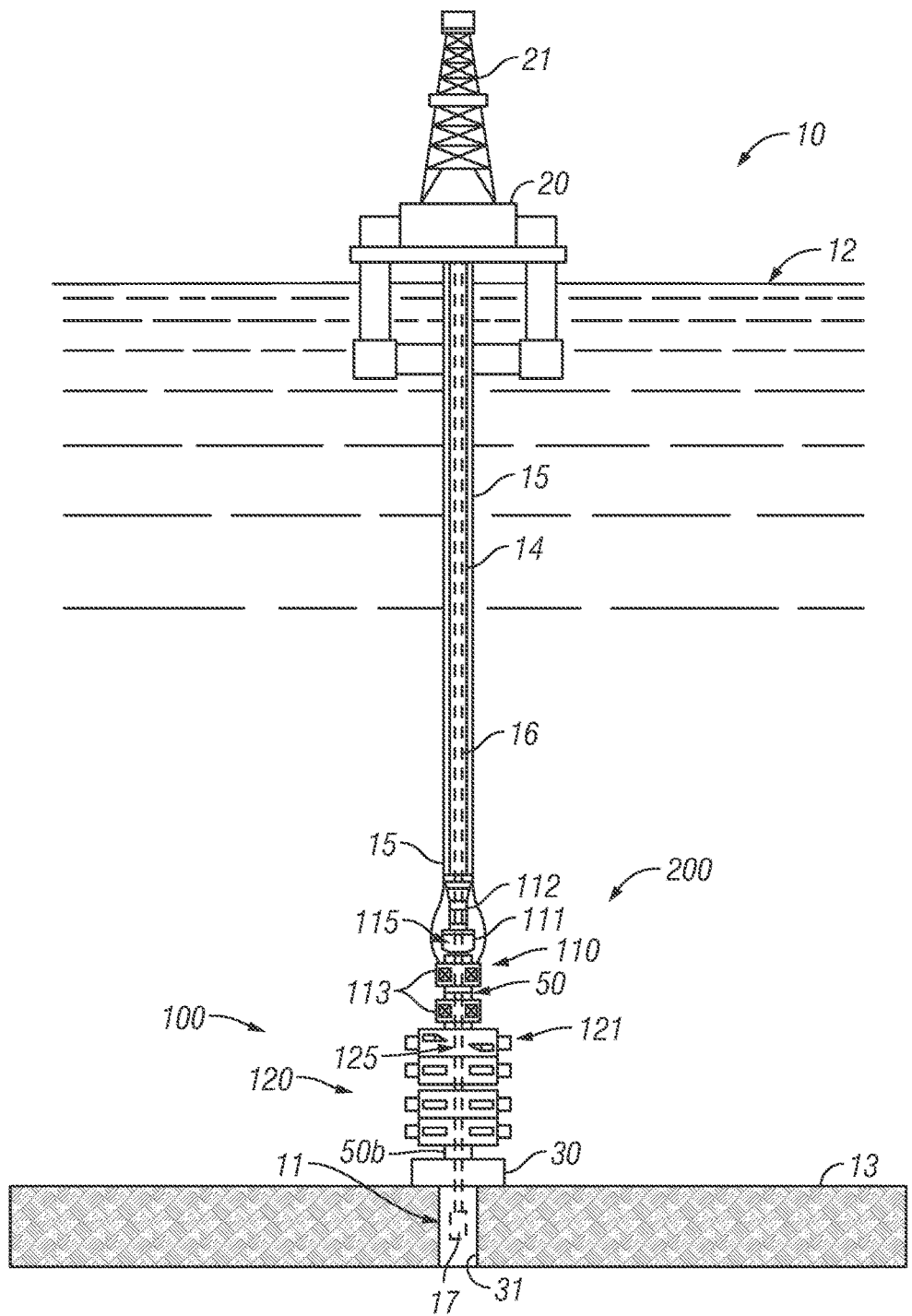
FIG. 1 shows a schematic view of an offshore system for drilling and/or producing a subterranean wellbore according to one or more embodiments.

Referring now to FIG. 1, an embodiment of an offshore system 10 for drilling and/or producing a wellbore 11 is shown. In this embodiment, the system 10 includes an offshore vessel or platform 20 at the sea surface 12 and a subsea BOP stack assembly 100 mounted to a wellhead 30 at the sea floor 13. The platform 20 is equipped with a derrick 21 that supports a hoist (not shown). A tubular drilling riser 14 extends from the platform 20 to the BOP stack assembly 100. The riser 14 returns drilling fluid or mud to the platform 20 during drilling operations. One or more hydraulic conduit(s) 15 extend along the outside of the riser 14 from the platform 20 to the BOP stack assembly 100. The conduit(s) 15 supply pressurized hydraulic fluid to the assembly 100. Casing 31 extends from the wellhead 30 into the subterranean wellbore 11.

Downhole operations are carried out by a tubular string 16 (e.g., drillstring, production tubing string, coiled tubing, etc.) supported by the derrick 21 and extending from the platform 20 through the riser 14, through the BOP stack assembly 100, and into the wellbore 11. A downhole tool 17 is connected to the lower end of the tubular string 16. In general, the downhole tool 17 may comprise any suitable downhole tool(s) for drilling, completing, evaluating, and/or producing the wellbore 11 including, without limitation, drill bits, packers, cementing tools, casing or tubing running tools, testing equipment, perforating guns, and the like. During downhole operations, the string 16, and hence the tool 17 coupled thereto, may move axially, radially, and/or rotationally relative to the riser 14 and the BOP stack assembly 100.

Figure 2:
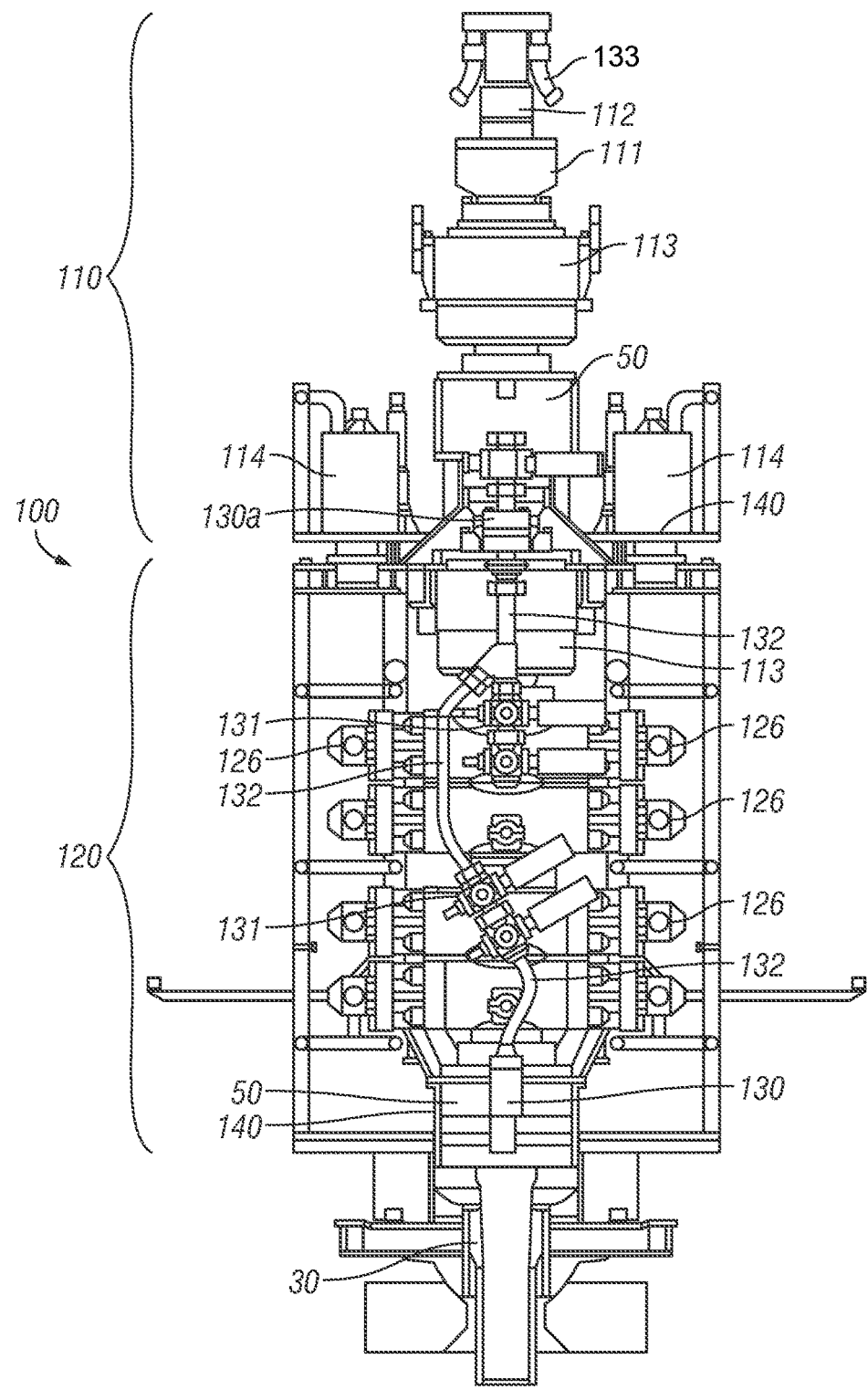
FIG. 2 shows an elevation view of the subsea BOP stack assembly of FIG. 1 according to one or more embodiments.
Figure 3:
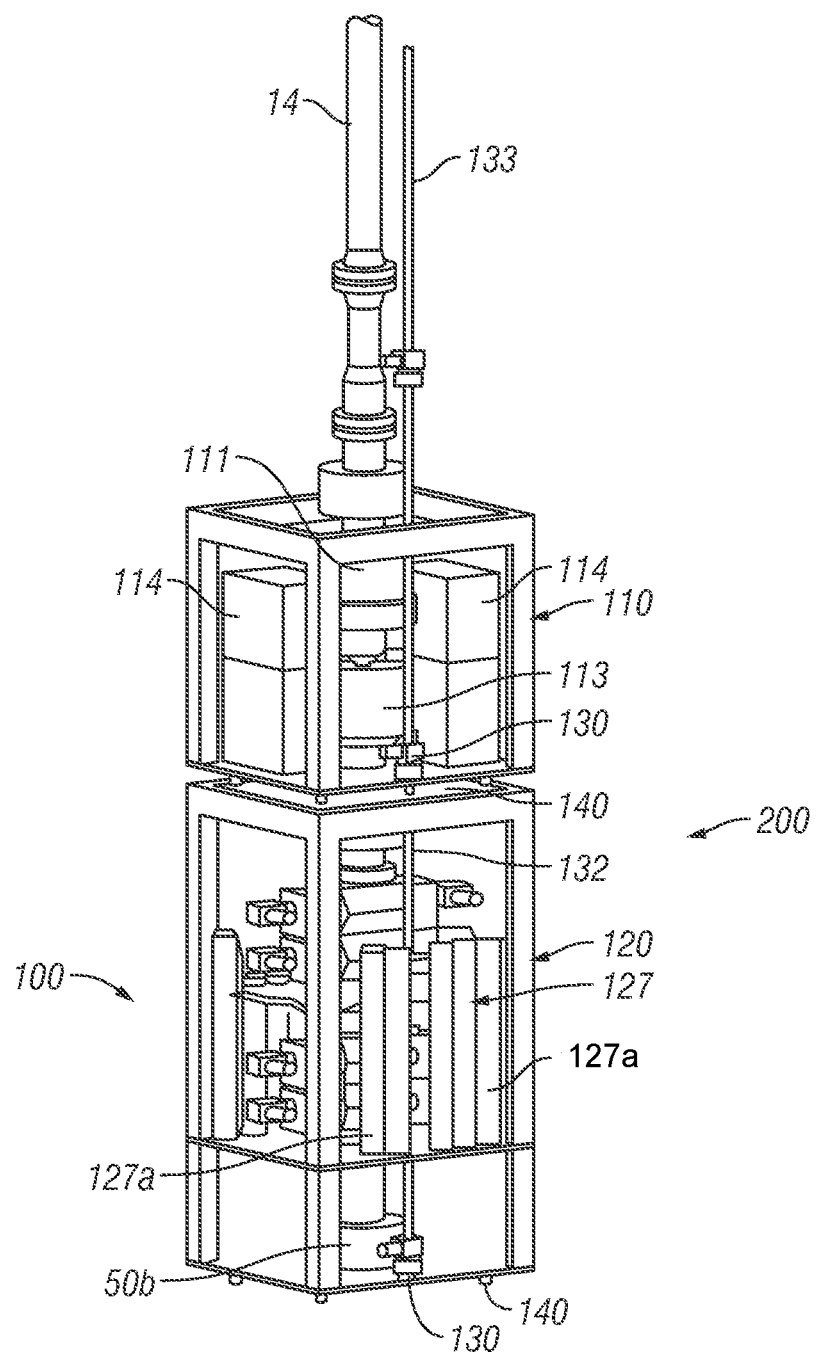
FIG. 3 shows a perspective view of the subsea BOP stack assembly of FIGS. 1 and 2 according to one or more embodiments.
Figure 3:
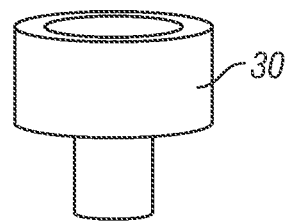

Referring now to FIGS. 1-3, the BOP stack assembly 100 is mounted to the wellhead 30 to control and seal the wellbore 11, thereby containing the hydrocarbon fluids (liquids and gases) within the wellbore 11. In this embodiment, the BOP stack assembly 100 comprises a lower marine riser package (LMRP) 110 and a BOP or BOP stack 120. The BOP stack 120 is releasably secured to the wellhead 30 as well as the LMRP 110. Likewise, the LMRP 110 is releasably secured to the BOP stack 120 and the riser 14. In this embodiment, the connections between the wellhead 30, the BOP stack 120, and the LMRP 110 include hydraulically actuated, mechanical wellhead-type connections 50. Further, the connection between LMRP 110 and the riser 14 is a flange connection that is remotely controlled, just as the connections 50 may be remotely, hydraulically controlled.

The LMRP 110 includes a riser flex joint 111, a riser adapter 112, one or more annular BOPs 113, and a pair of redundant control units or pods 114. A flow bore 115 extends through the LMRP 110 from the riser 14 at the upper end of the LMRP 110 to the connection 50 at the lower end of the LMRP 110. The riser adapter 112 extends upward from the flex joint 111 and is coupled to the lower end of the riser 14. The flex joint 111 allows the riser adapter 112 and the riser 14 connected thereto to deflect angularly relative to the LMRP 110 while wellbore fluids flow from the wellbore 11 through the BOP stack assembly 100 into the riser 14. The annular BOP 113 comprises an annular elastomeric sealing element that is mechanically squeezed radially inward to seal on a tubular extending through the LMRP 110 (e.g., the string 16, casing, drillpipe, drill collar, etc.) or seal off the flow bore 115. Thus, the annular BOP 113 has the ability to seal on a variety of pipe sizes and/or profiles.

In this embodiment, the BOP stack 120 comprises at least one annular BOP 113 as previously described, choke-and-kill valves 131, and choke-and-kill lines 132. Choke-and-kill line connections 130 connect the female choke-and-kill connectors of the LMRP 110 with the male choke-and-kill adapters of the BOP stack 120, thereby placing the choke-and-kill connectors of the LMRP 110 in fluid communication with the choke lines 132 of the BOP stack 120. A main bore 125 extends through the BOP stack 120. In addition, the BOP stack 120 includes a plurality of axially stacked rain BOPs 121. Each rain BOP 121 includes a pair of opposed rams and a pair of actuators 126 that actuate and drive the matching rams. In this embodiment, the BOP stack 120 includes four rain BOPs 121—an upper rain BOP 121 including opposed blind shear rams or blades for severing the tubular string 16 and sealing off the wellbore 11 from the riser 14 and the three lower rain BOPs 121 including the opposed pipe rams for engaging the string 16 and sealing the annulus around the tubular string 16. In other embodiments, the BOP stack (e.g., the stack 120) may include a different number of rams, different types of rams, one or more annular BOPs, or combinations thereof. The control pods 114 include subsea electronics modules (SEMs) and operate the valves 131, the rain BOPs, and the annular BOPs 113 of the LMRP 110 and the BOP stack 120.

As best shown in FIG. 3, the BOP stack 120 also includes at least one set or bank 127 of hydraulic accumulators 127a mounted on the BOP stack 120. While the primary hydraulic pressure supply is provided by the hydraulic conduits 15 extending along the riser 14, the accumulator bank(s) 127 may also be used to support operation of the rams, the choke-and-kill valves 131, the connector 50b of the BOP stack 120, and the choke-and-kill connectors 130 of the BOP stack 120. The accumulator bank(s) 127 serve as a backup means to provide hydraulic power to operate the rams, the valves 131, the connector 50b, and the connectors 130 of the BOP stack 120. Further, although the control pods 114 may be used to operate the BOPs 121 and the choke-and-kill valves 131 of the BOP stack 120 in this embodiment, in other embodiments the BOPs 121 and the choke-and-kill valves 131 may also be operated by one or more subsea remotely operated vehicles (ROVs).

As previously described, in this embodiment, the BOP stack 120 includes one annular BOP 113 and four sets of rams (one set of shear rams and three sets of pipe rams). However, in other embodiments, the BOP stack 120 may include different numbers of rams, different types of rams, different numbers of annular BOPs (e.g., annular BOP 113), or combinations thereof. Further, although the LMRP 110 is shown and described as including one annular BOP 113, in other embodiments, the LMRP (e.g., LMRP 110) may include a different number of annular BOPs (e.g., two sets of annular BOPs 113). Further, although the BOP stack 120 may be referred to as a "stack" since it contains a plurality of rain BOPs 121 in this embodiment, in other embodiments, BOP 120 may include only one rain BOP 121.

Both the LMRP 110 and the BOP stack 120 comprise re-entry and alignment systems 140 that allow the LMRP 110-BOP stack 120 connections to be made subsea with all the auxiliary connections (i.e. control units, choke-and-kill lines) aligned. The choke-and-kill line connectors 130 interconnect the choke-and-kill lines 132 and the choke-and-kill valves 131 on the BOP stack 120 to the choke-and-kill lines 133 on the riser adapter 112. Thus, in this embodiment, the choke-and-kill valves 131 of the BOP stack 120 are in fluid communication with the choke-and-kill lines 133 on the riser adapter 112 via the connectors 130. However, the alignment systems 140 are not always necessary and need not be included.

Figure 4:
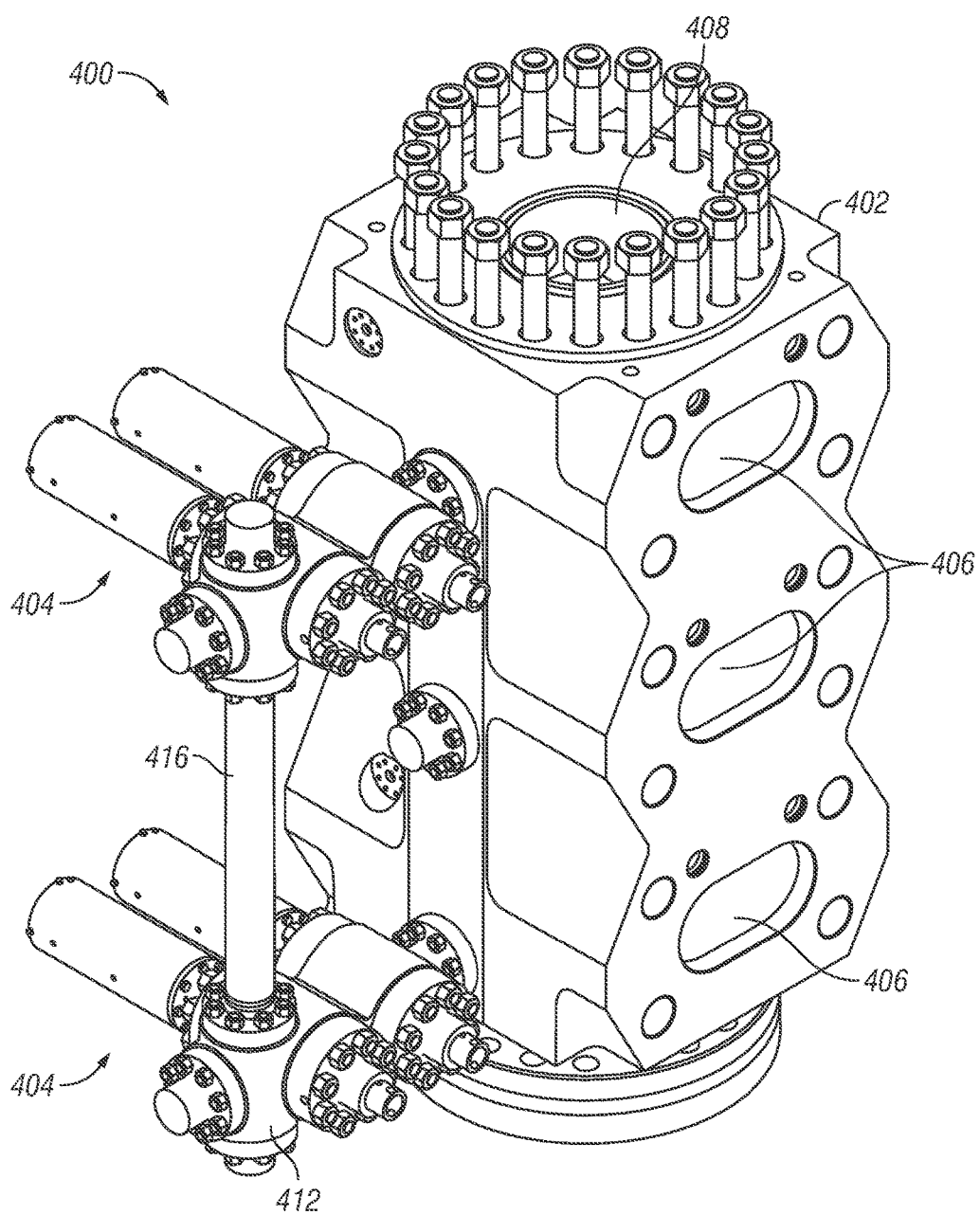
FIG. 4 shows a perspective view of a subsea system including a subsea connection according to one or more embodiments.
Figure 5:
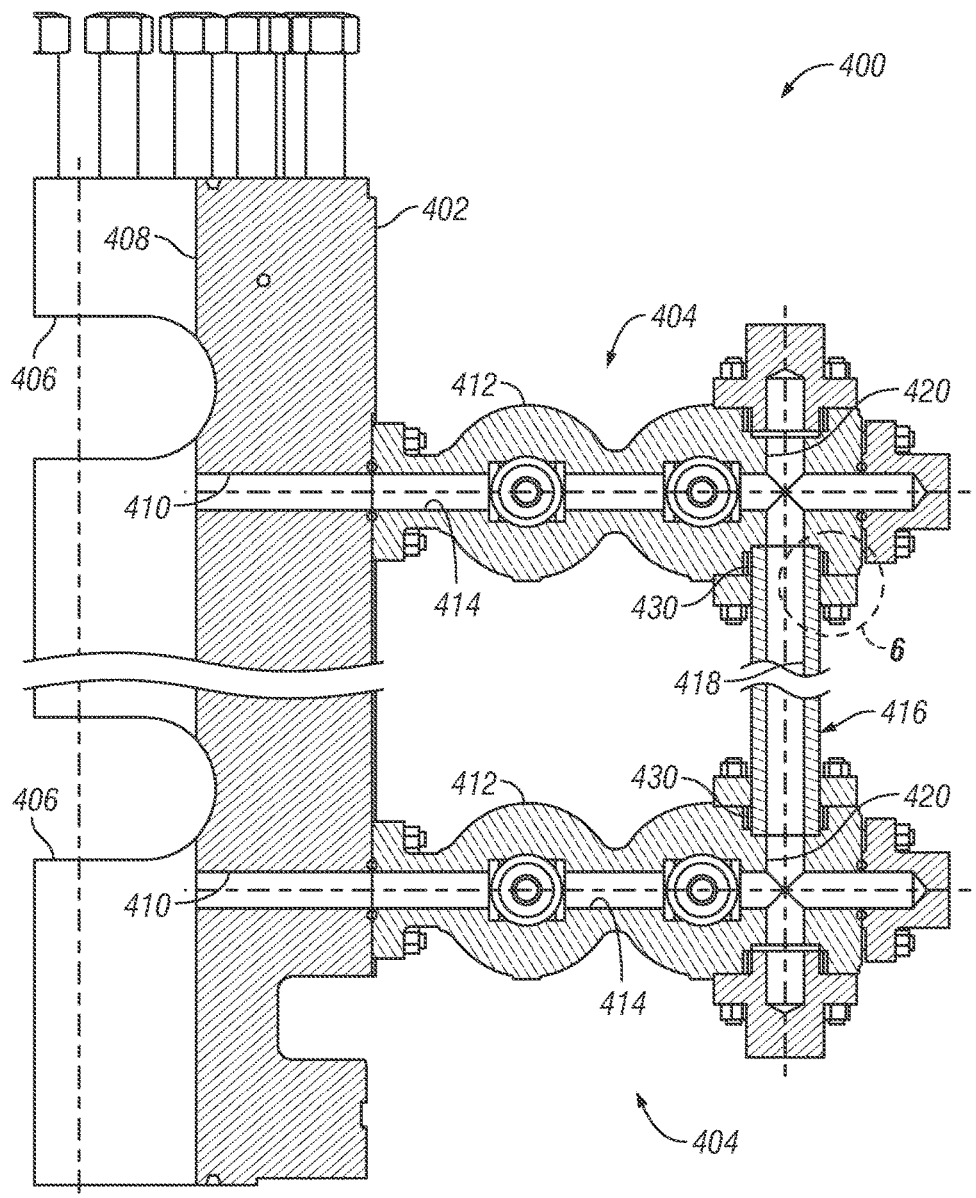
FIG. 5 shows a cross-sectional view of the subsea system of FIG. 4 according to one or more embodiments.

Referring now to FIGS. 4 and 5, multiple views of a subsea system 400 including a BOP body 402 with one or more valves 404 coupled to the BOP body 402 are shown. FIG. 4 shows a perspective view of the system 400, and FIG. 5 shows a cross-sectional view of the system 400. The BOP body 402 shown is a rain BOP body, and therefore includes one or more cavities 406 formed therethrough. The cavities 406 are used to movably house or receive rams within the BOP body 402 to selectively control fluid flow through a bore 408 of the BOP body 402. The BOP body 402 also includes one or more choke-and-kill line ports 410 formed therein. As shown, the choke-and-kill line ports 410 intersect and fluidly communicate with the bore 408 of the BOP body 402. The choke-and-kill line ports 410 are each also formed axially below a corresponding cavity 406 with respect to the bore 408.

Valves 404 are coupled to the BOP body 402 such that the valves 404 are in fluid communication with and selectively control fluid flow through the choke-and-kill line ports 410. In this embodiment, two valves 404 are shown as in fluid communication with each choke-and-kill line port 410 to provide fluid control through each port 410, though the present disclosure is not so limited. Each valve 404 includes a body 412 with a flow path 414 formed through the body 412 that is in fluid communication with the choke-and-kill line port 410. The valves 404 are also in fluid communication with each other through a spool 416. The spool 416 is positioned between the valves 404 and includes a flow path 418 formed therethrough that is in fluid communication with the flow paths 414 of the valves 404. In particular, each valve body 412 may include a flow path 420 that intersects with the flow path 414. The spool 416 may be in direct fluid communication with the flow paths 420 of the valve bodies 412 and indirect fluid communication with the flow paths 414 of the valve bodies 412. The subsea system 400 further includes one or more sealed fluid connections 430 to facilitate fluid communication and fluid flow within the system 400. The sealed fluid connections 430 may be included between the spool 416 and the valve 404, such as included at each end of the spool 416 between the valves 404.

Figure 6:
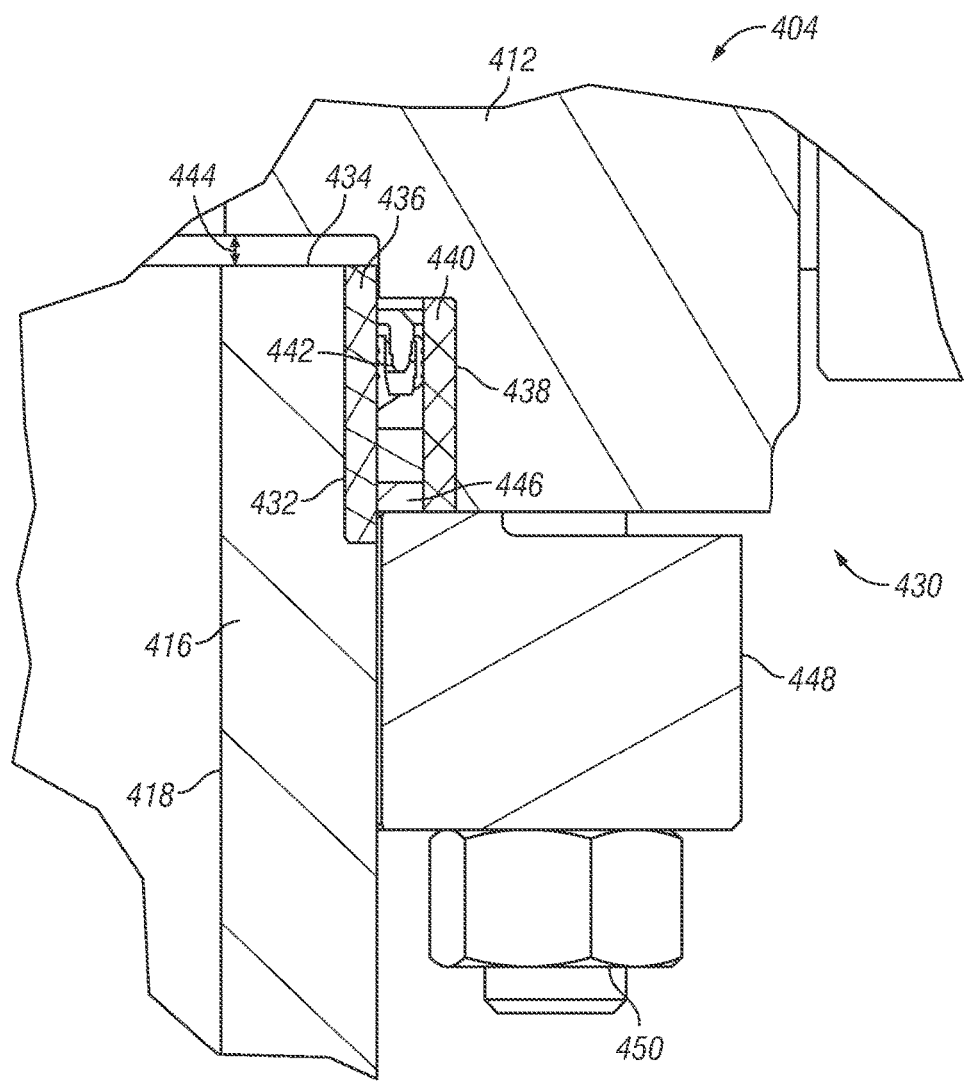
FIG. 6 shows a detailed cross-sectional view of the subsea connection of FIG. 5, according to one or more embodiments.

FIG. 6 provides a detailed view of the subsea connection 430 with reference to FIG. 5. As shown in FIG. 6, an end 434 of the spool 416 may be received within the body 412 of the valve 404. Further, a recess 432 is formed radially about the outer surface at or near the end 434 of the spool 416. A corrosion resistant treatment or material, such as a corrosion resistant alloy (CRA), is included or positioned within the recess 432 such that the corrosion resistant material may be inlaid, clad, or deposited into the recess 432 to form a corrosion resistant material layer 436 at the end 434 of the spool 416.

A recess 438 may also be formed radially within an inner surface of the body 412 of the valve 404 opposite the recess 432. Corrosion resistant material is included or positioned within the recess 438, with the corrosion resistant material inlaid or deposited into the recess 438 to form a corrosion resistant material layer 440 within the body 412. A corrosion resistant material, such as a CRA, may be completely formed from or include a nonferrous alloy, in which the nonferrous alloy may include titanium, nickel, cobalt, chromium, and/or molybdenum. The sum of the elements of titanium, nickel, cobalt, chromium, and/or molybdenum usually exceed 50% by weight of the nonferrous alloy. In another embodiment, the corrosion resistant material may include a layer formed from ceramic or nitride to increase the corrosion resistance within the subsea connection 430.

The subsea connection 430 is a sealed connection, and therefore a seal is formed between the spool 416 and the body 412 of the valve 404 when coupled with each other. In particular, the seal is formed against the corrosion resistant material layer 436 and/or 440 to prevent fluid flow across the corrosion resistant material layers 436 and 440. The seal may include or be formed by an elastomeric seal and/or a metal-to-metal seal. In the embodiment in FIG. 6, the seal includes an elastomeric sealing element 442 (e.g., non-metal sealing element), such as a self-energizing seal or a pressure-energized seal. The sealing element 442 is positioned radially about the end 434 of the spool 416 between the spool 416 and the body 412 of the valve 404. The sealing element 442 may activate or engage the radial surfaces of the spool 416 and the body 412 of the valve 404, thereby forming a seal against each of these surfaces when the connection 430 is formed.

As shown in FIG. 6, a gap 444 may be formed between the end 434 of the spool 416 and the body 412 of the valve 404. The gap 444 may enable the spool 416 to be axially movable with respect to the body 412 of the valve 404. The gap 444 may accommodate tolerances and/or thermal expansion between the spool 416 and the body 412 such that the connection 430 may be made up in the field without having to modify or alter the connection 430. Further, during use, fluid may communicate through the gap 444 and between the end 434 of the spool 416 and the body 412 of the valve 404. As the sealing element 442 may be a self-energizing seal or a pressure-energized seal, fluid pressure may be used to facilitate sealing with the sealing element 442 between the end 434 of the spool 416 and the body 412 of the valve 404. A reinforcement member 446 may be positioned between the spool 416 and the body 412, such as between the corrosion resistant material layers 436 and 440, to support the sealing element 442 between the corrosion resistant material layers 436 and 440. Further, in this embodiment, a collar or a flange 448 may be positioned about the spool 416 and coupled to the body 412 through one or more fasteners 450 (e.g., bolts or screws) to retain the sealing element 442 in position between the spool 416 and the body 412 of the valve 404.

A subsea connection in accordance with the present disclosure may be weldless or include no welds when assembling in the field for use. Accordingly, as mentioned above, the gap 444 may be present to facilitate assembly of the connection 430 in the field. Further, this may enable the subsea connection to be suitable for high-pressure high-temperature (HPHT) applications, whereas welded or fabricated spools may have a higher risk to fracture, leak, or otherwise fail in HPHT applications. HPHT applications and wells generally relate to an environment where the undisturbed bottom hole temp at prospective reservoir depth or total depth is greater than 300° F. or 150° C., and either the maximum anticipated pore pressure of any porous formation to be drilled through exceeds a hydrostatic gradient of 0.8 psi/ft or 18100 Pa/m, or a well requiring pressure control equipment with a rated working pressure in excess of 10000 psi or 69000 kPa. Drilling wells with these characteristics pose special challenges due to inaccessibility and the high pressures and temperatures. Furthermore, a subsea connection in accordance with the present disclosure may be compliant with API 17TR8 standards, in which the American Petroleum Institute provides guidelines for HPHT design guidelines.

Figure 7:
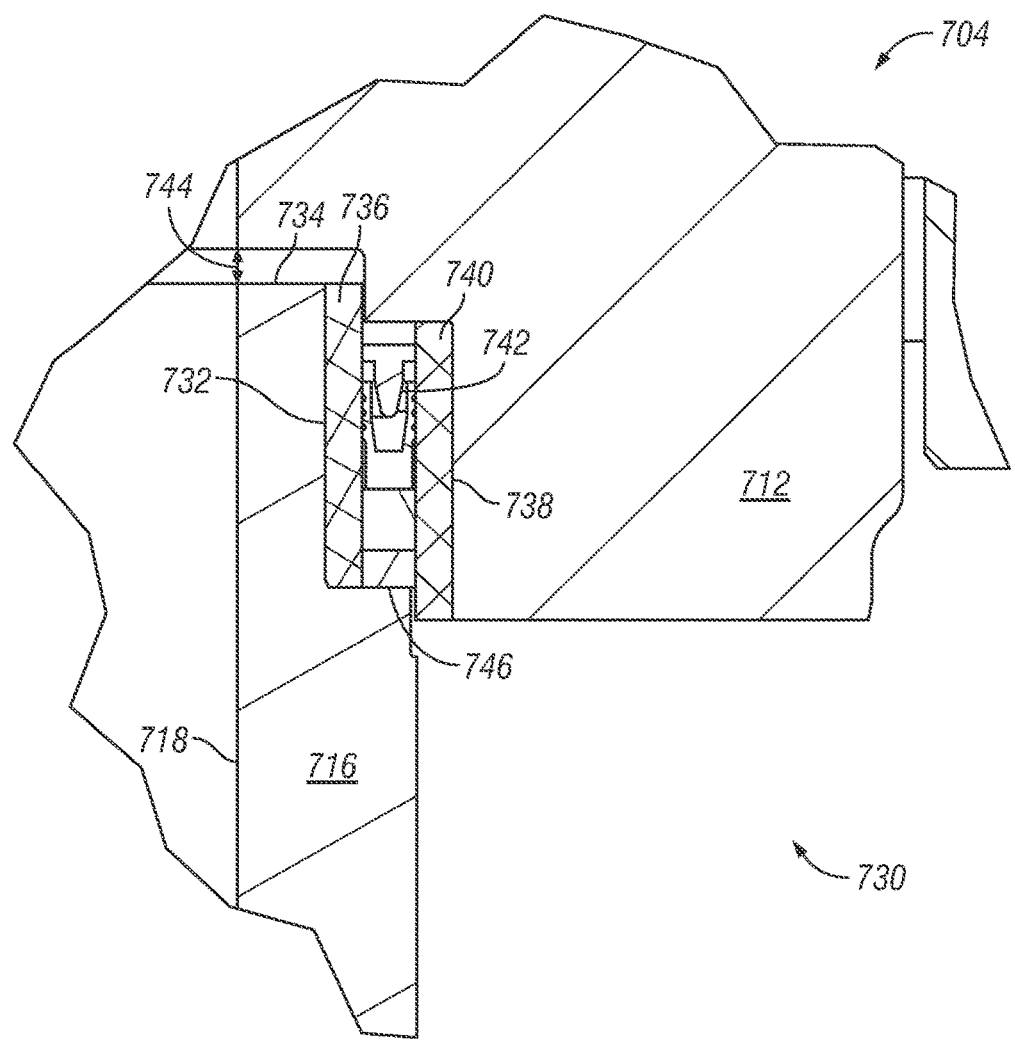
FIG. 7 shows a detailed cross-sectional view of a subsea connection according to one or more embodiments.

Referring now to FIG. 7, a subsea connection 730 in accordance with one or more embodiments of the present disclosure is shown. The subsea connection 730 is similar to the subsea connection 430 shown in FIG. 6, but the subsea connection 730 does not include a flange to retain the sealing element 742 in position between the spool 716 and the body 712 of the valve 704. Rather, in this embodiment, the recess 732 formed in the end 734 of the spool 716 is deep or large enough such that the sealing element 742 may be at least partially positioned or retained within the recess 732, as opposed to the corrosion resistant material layer 736 being formed flush or level with the remaining outer radial surface of the spool 716 in FIG. 6. This arrangement may enable the spool 716 to retain the sealing element 742 in position between the spool 716 and the body 712 of the valve 704. The corrosion resistant material layer 736 remains positioned between the sealing element 742 and the spool 716 when the subsea connection 730 is assembled.

Figure 8:
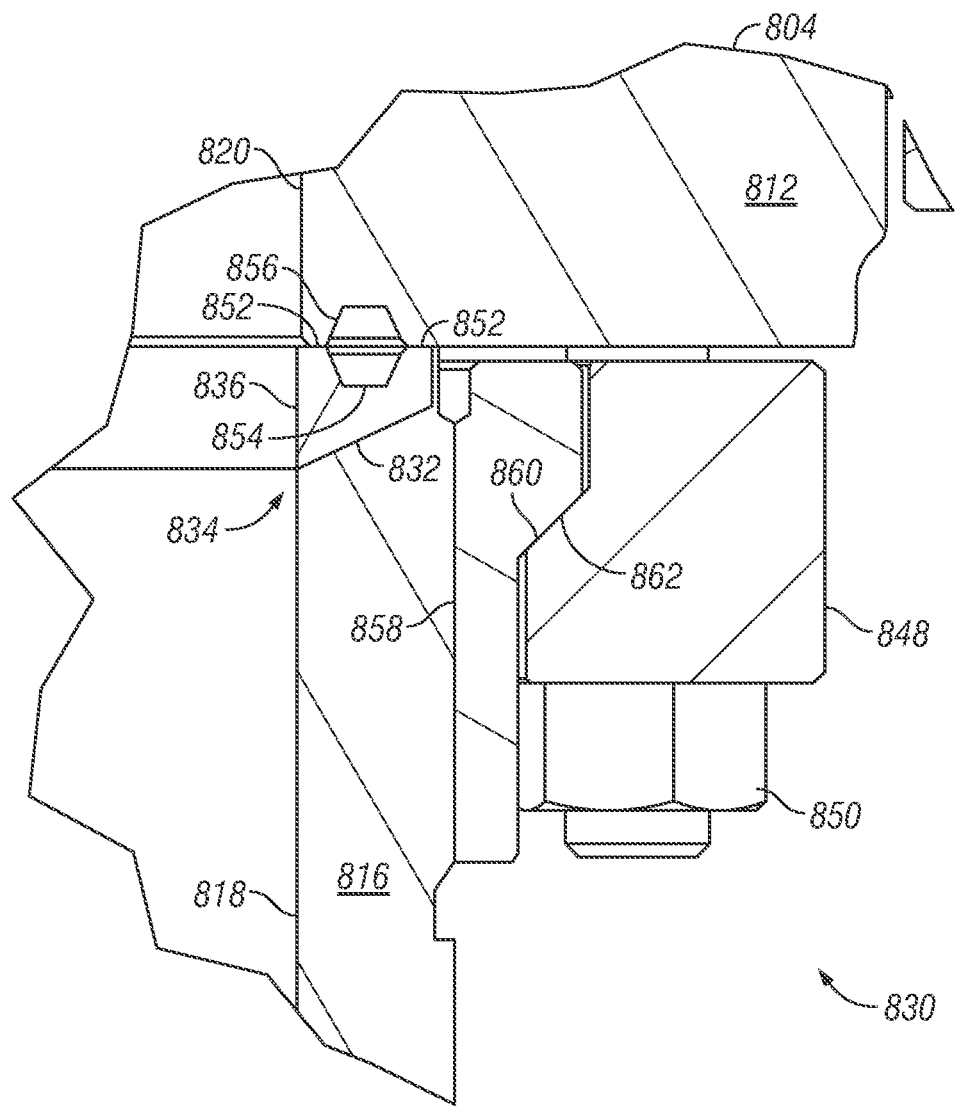
FIG. 8 shows a detailed cross-sectional view of a subsea connection according to one or more embodiments.

Referring now to FIG. 8, an embodiment of a subsea connection 830 in accordance with one or more embodiments of the present disclosure is shown. The subsea connection 830 includes a spool 816 and a valve 804 including a body 812. In this embodiment, the spool 816 is coupled to the valve body 812 such that an end 834 of the spool 816 abuts the valve body 812. When coupled, a flow path 818 of the spool 816 is in fluid communication with a flow path 820 formed in the valve body 812.

A recess 832 is formed at or near the end 834 of the spool 816. In particular, in this embodiment, the recess 832 is formed at an axial end of the spool 816 and radially about an inner surface at the end 834 of the spool 816. Corrosion resistant material is inlaid or deposited into the recess 832 to form a corrosion resistant material layer 836 at the end 834 of the spool 816.

As the subsea connection 830 is a sealed connection, a seal is formed between the spool 816 and the body 812 of the valve 804 when coupled with each other. In this embodiment, the seal is formed as one or more metal-to-metal seals 852 between the spool 816 and the body 812 of the valve 804 when coupled with each other. The metal-to-metal seals 852 are formed against the corrosion resistant material layer 836 and the valve body 812 to prevent fluid flow across the corrosion resistant material layer 836. Further, though not specifically shown in this embodiment, the valve body 812 may also include a corresponding corrosion resistant material layer. To facilitate forming the metal-to-metal seals 852, a ring groove 854 may be formed in the corrosion resistant material layer 836, and a ring groove 856 may be formed in the valve body 812. If both the ring grooves 854 and 856 are included in the connection 830, the ring grooves 854 and 856 may be aligned with each other with respect to the flow paths 818 and 820 to facilitate forming the metal-to-metal seals 852 between the spool 816 and the body 812.

Continuing with FIG. 8, a collar 858 and a flange 848 may be used to facilitate forming sealing engagement between the spool 816 and the body 812 of the valve 804. The collar 858 may be positioned about the spool 816 and also threadedly engage the spool 858 or otherwise be attached. Further, the flange 848 may be positioned about the spool 816 and the collar 858 and coupled to the body 812 through one or more fasteners 850 (e.g., bolts or screws). The collar 858 includes a collar shoulder 860 that engages with a corresponding flange shoulder 862 of the flange 848. The shoulders 860 and 862 are used to couple the collar 858 and the spool 816 to the body 812, and also facilitate forming the metal-to-metal seals 852 between the corrosion resistant material layer 836 and the valve body 812 by forcing the corrosion resistant material layer 836 and the valve body 812 against each other.

Figure 9:
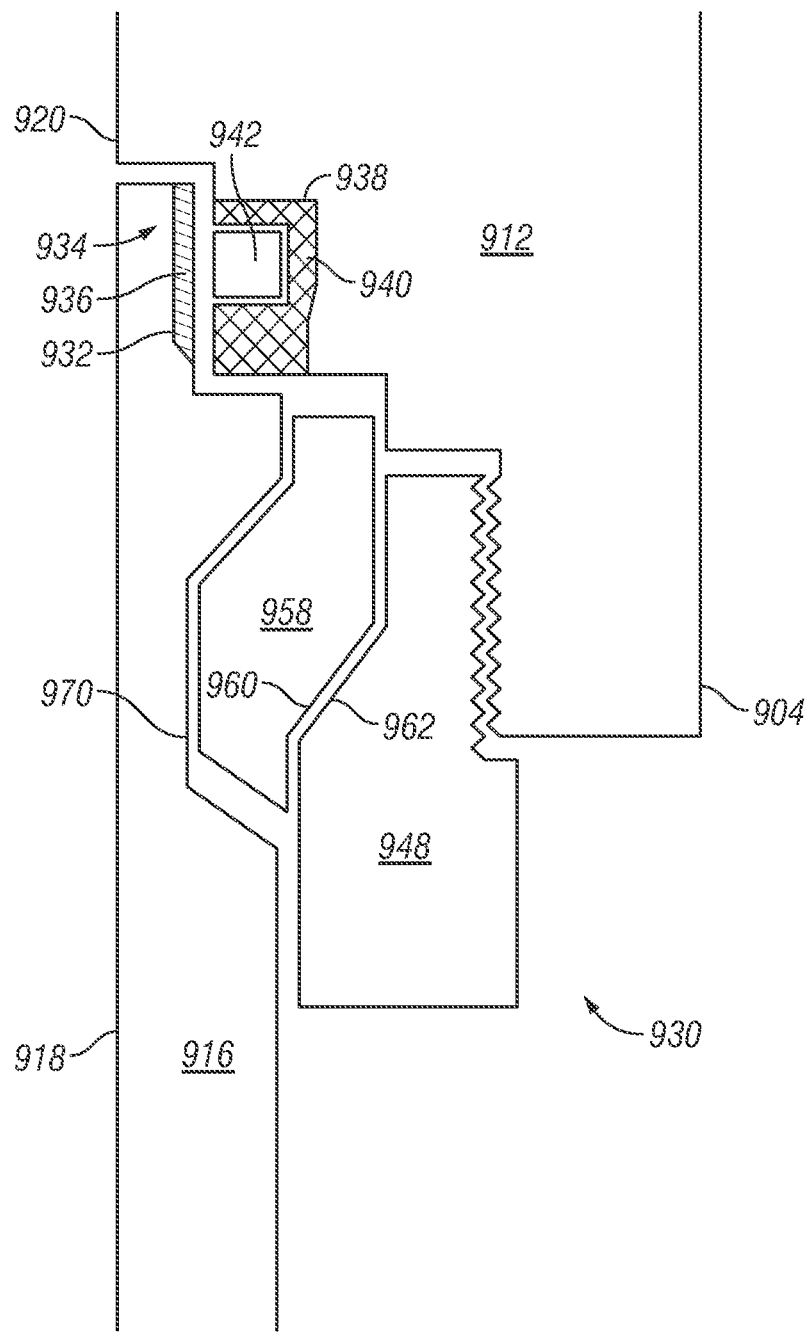
FIG. 9 shows a detailed cross-sectional view of a subsea connection according to one or more embodiments.

Referring now to FIG. 9, an embodiment of a subsea connection 930 in accordance with one or more embodiments of the present disclosure is shown. The subsea connection 930 includes a spool 916 and a valve 904 including a body 912 such that, when coupled, a flow path 918 of the spool 916 is in fluid communication with a flow path 920 formed in the valve body 912.

A recess 932 is formed at or near the end 934 of the spool 916. In particular, in this embodiment, the recess 932 is formed at an axial end of the spool 916 and radially about an outer surface at the end 934 of the spool 916. Corrosion resistant material is inlaid or deposited into the recess 932 to form a corrosion resistant material layer 936 at the end 934 of the spool 916. A recess 938 may also be formed radially within an inner surface of the body 912 of the valve 904 opposite the recess 932. Corrosion resistant material is included or positioned within the recess 938, with the corrosion resistant material inlaid or deposited into the recess 938 to form a corrosion resistant material layer 940 within the body 912.

A seal is formed against the corrosion resistant material layer 936 and/or 940 to prevent fluid flow between the spool 916 and the body 912 of the valve 904 when coupled with each other. In the embodiment in FIG. 9, the seal includes an elastomeric sealing element 442 (e.g., non-metal sealing element), such as a self-energizing seal or a pressure-energized seal. The sealing element 942 is positioned radially about the end 934 of the spool 916 between the spool 916 and the valve body 912.

Continuing with FIG. 9, a collar 958 and a flange 948 may be used to facilitate forming sealing engagement between the spool 916 and the valve body 912. In this embodiment, a groove 960 may be formed in an outer radial surface of the spool 916 with the collar 958 positioned within the groove 960. For example, the collar 958 may be formed as a split ring to be positioned within the groove 970. Further, the flange 948 may be positioned about the spool 916 and the collar 958 and threadedly coupled to the body 912. The collar 958 includes a collar shoulder 960 that engages with a corresponding flange shoulder 962 of the flange 948. The shoulders 960 and 962 are used to couple the collar 958 and the spool 916 to the body 912.

As discussed above, a subsea connection in accordance with the present disclosure may allow for simpler manufacturing and assembly, particularly when the subsea connection is required to be assembled in the field for use. Further, the subsea connection may be assembled without welding, if desired, and may be suitable for HPHT applications, which are found within the oil and gas industry.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . " Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A subsea connection for a pressurized fluid flow path, comprising:
   a body comprising:
      a body flow path;
      a body recess formed within the body; and
      a corrosion resistant material positioned within the body recess to form a corrosion resistant layer;
   a spool attachable to the body, the spool comprising:
      a spool flow path in fluid communication with the body flow path with the spool attached to the body; and
      a spool recess formed at an end of the spool; and
      another corrosion resistant material positioned within the spool recess to form another corrosion resistant layer; and
   a seal, wherein the seal is actuatable against the corrosion resistant layers to form a seal between the body and the spool.

2. The connection of claim 1, wherein the seal comprises an elastomeric sealing element positioned radially about the spool.

3. The connection of claim 1, wherein the spool recess is formed about a radial outer surface of the spool.

4. The connection of claim 2, wherein the spool recess is formed at an axial end of the spool.

5. The connection of claim 2, wherein the elastomeric sealing element is positioned between the corrosion resistant layers.

6. The connection of claim 1, wherein the spool is weldless for use within high-pressure high-temperature applications and the connection is compliant with API 17TR8 standards.

7. The connection of claim 1, further comprising a flange positioned about the spool and configured to couple to the body.

8. The connection of claim 6, further comprising a collar positioned about and threadedly engaged with the spool, the collar comprising a load shoulder such that the flange is engageable with the load shoulder when coupled to the body and the body is connected with the spool.

9. The connection of claim 1, wherein the seal comprises a metal-to-metal seal.

10. The connection of claim 1, wherein the body comprises a valve configured to couple to a port of a subsea blowout preventer to control fluid flow between the subsea blowout preventer and a choke-and-kill line.

11. The connection of claim 1, wherein the body comprises a valve such that the spool is configured to couple to the valve at one end and couple to another valve at another end.

12. The connection of claim 1, wherein the end of the spool is receivable within the body to couple the spool to the body.

13. The connection of claim 1, wherein a gap is formed between the end of the spool and the body.

14. The connection of claim 1, wherein at least one of the corrosion resistant layers comprises a nonferrous alloy comprising titanium, nickel, cobalt, chromium, and/or molybdenum.

15. A subsea system, comprising:
a subsea blowout preventer comprising a choke-and-kill line port;
a valve attachable with the subsea blowout preventer and comprising a flow path in fluid communication with the choke-and-kill line port when connected with the subsea blowout preventer;
a spool attachable with the valve, the spool comprising:
a spool flow path in fluid communication with the flow path of the valve with the spool attached to the valve;
a corrosion resistant alloy (CRA) material layer formed on the spool; and
a seal, wherein the seal is actuatable against the CRA material layer to form a seal between the valve and the spool.

16. The system of claim 15, wherein the subsea blowout preventer comprises another choke-and-kill line port formed within the subsea blowout preventer, the system further comprising:
another valve configured to couple with the subsea blowout preventer and comprising a flow path configured to be in fluid communication with the other choke-and-kill line port; and
the spool configured to couple to the valve at one end and couple to the other valve at another end such that the flow paths of the valves are in fluid communication with each other through the spool flow path.

17. The system of claim 15, wherein the spool is weldless for use within a high-pressure and high-temperature environment and is compliant with API 17TR8 standards.

18. The system of claim 15, wherein:
the spool comprises a recess formed therein; and
the CRA material layer is deposited within the recess.

19. A method of establishing a pressurized fluid flow path subsea, the method comprising:
coupling a spool to a body to establish fluid communication between a flow path of the spool with a flow path of the body; and
forming a seal between the body and the spool, the seal formed against a corrosion resistant layer positioned within a spool recess formed at an end of the spool and another corrosion resistant layer positioned within a body recess formed within the body.

* * * * *